(No Model.)
W. CHRYSTLER.
MOLASSES COOLER.
No. 327,067. Patented Sept. 29, 1885.
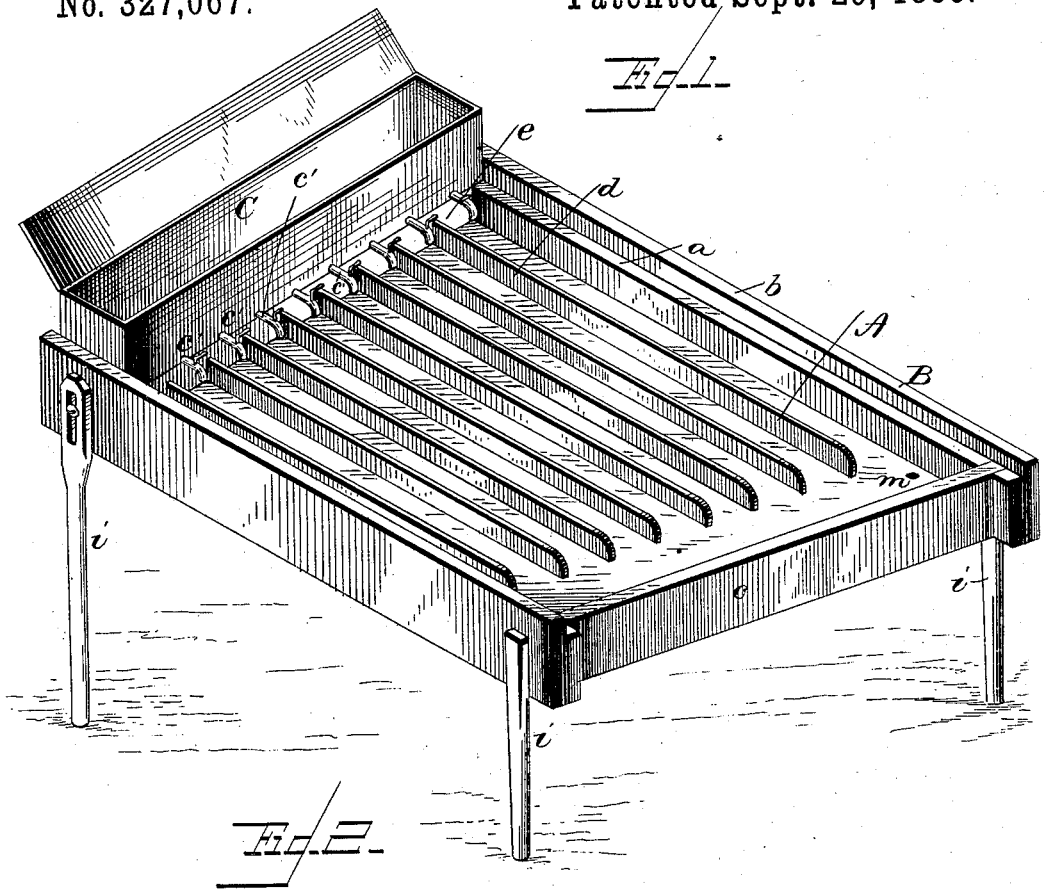
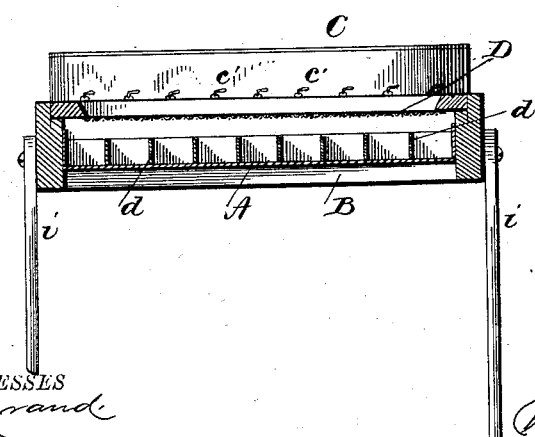
WITNESSES
F. L. Ourand
John T. Suter
INVENTOR
William Chrystler
By F. A. Fouts
Attorney

UNITED STATES PATENT OFFICE.

WILLIAM CHRYSTLER, OF LA GRANGE, INDIANA.

MOLASSES-COOLER.

SPECIFICATION forming part of Letters Patent No. 327,067, dated September 29, 1885.

Application filed June 8, 1885. (No model.)

*To all whom it may concern:*

Be it known that I, WILLIAM CHRYSTLER, a citizen of the United States, residing at La Grange, in the county of La Grange and State of Indiana, have invented certain new and useful Improvements in Molasses-Coolers; and I do hereby declare the following to be a full, clear, and exact description of the invention, such as will enable others skilled in the art to which it appertains to make and use the same.

This invention is to certain apparatus by which the sirup or molasses resultant from the ordinary evaporating process in the manufacture of sugar is caused to be atmospherically cooled; and its prime object is the provision of means by which this operation may be conducted in a manner that the degree of color or flavor of the sirup may be thoroughly regulated by the attendant or operator in charge, said means being applicable also to the cooling of other substances.

The invention consists, substantially, in the apparatus as constructed, and in such other details as will hereinafter be distinctly described, and pointed out in the claims.

Referring to the accompanying sheet of drawings, Figure 1 represents a perspective view of apparatus embodying my invention, and Fig. 2 represents a sectional end elevation thereof.

Reference being had to the several parts by the letters marked thereon, A represents a pan or trough, preferably of copper, and inclosed in a wooden casing, B, the upper edge of the two longitudinal sides of the latter being rabbeted or grooved, as represented at $a$, and for a purpose to be hereinafter described. One of said sides $b$ is of a length slightly greater than the other, and the end piece, $c$, that unites the two at their lower ends is caused to tend obliquely in consequence thereof, the bottom of the pan conforming to this construction, as shown. The pan is divided lengthwise into a series of channels by means of the partitions $d$, each partition being of a length slightly greater than its preceding one, to conform relatively to the two sides of the pan or casing, and the upper heads or extremities of said channels are closed by the transverse strip $e$.

Situated between the two sides of the casing at the head or upper end of the pan is a tank or reservoir, C, in which the molasses or sirup is contained, and from which it flows into the channels, said tank being provided with a series of cocks or faucets, $c'$, communicating with the channels, as shown, and which may be suitably regulated at pleasure. This tank may be moved forward between the sides of the casing in the grooved or rabbeted edges thereof, and thus may the length of the flow be regulated by which to give to the substance a darker or lighter color and a consequent difference in flavor. In addition, however, it is desirable that the rapidity of its flow should be capable of regulation, and to effect this I have mounted the casing and pan upon suitable legs, $i$, those at the upper end being of greater height and slotted, and set-screws entering the sides of the casing through the slots, by which the degree of pitch or incline of the pan may be very readily increased or diminished to cause the substance to flow more or less rapidly.

The pan is provided with a suitable outlet or discharge spout, $m$, through which the substance flows into any suitable device for its reception.

To prevent the settlement of dust or dirt, I have provided a screen, D, which fits over the top of the pan between the casing's sides, and which conforms in shape to the general contour of the pan. By the form of construction of lengthened side $b$ and connecting end piece, $c$, the substance in its flow will tend toward the opening $m$, as will be apparent.

It will be observed that the end of the screen-frame corresponding to the upper end of the pan is notched at points to accommodate the passage of the faucets, and from this it will be seen that when the tank is moved forward the screen is correspondingly moved.

Having thus described my invention, what I claim as new, and desire to secure by Letters Patent, is—

1. The combination of an adjustably-inclined pan separated into channels or divisions, and an adjustable tank located at the upper end thereof, substantially as described.

2. The combination of an adjustably-inclined pan divided into divisions or channels, an adjustable tank located at the upper end thereof, and a screen fitting over the top of said pan corresponding to its contour, substantially as described.

3. The combination of an adjustably-inclined pan divided into channels by partitions of gradually-increasing length, and having suitable outlet, a casing surrounding the pan, having sides rabbeted or grooved on their upper edges, one of the same being slightly the longer and the two united by an end piece, and a tank adjustable in the grooves of the casing's sides, the same having faucets opening into the channels, substantially as described.

4. The combination of the adjustably-inclined pan A, divided by the partitions $d$, the casing B, constructed as described, the tank having faucets $c'$, and the screen of like contour as the pan, having notches for the accommodation of the faucets, substantially as described.

5. The combination of the pan A and its casing adjustably inclined on legs and set-screws, and the tank adjustable between the sides of the casing, substantially as described.

In testimony whereof I affix my signature in presence of two witnesses.

WILLIAM CHRYSTLER.

Witnesses:
 E. T. COSPER,
 S. M. COSPER.